Jan. 1, 1929. 1,697,348
R. H. CUNNINGHAM
ADJUSTABLE COVER PLATE FOR ELECTRIC WALL BOXES
Filed Oct. 28, 1927
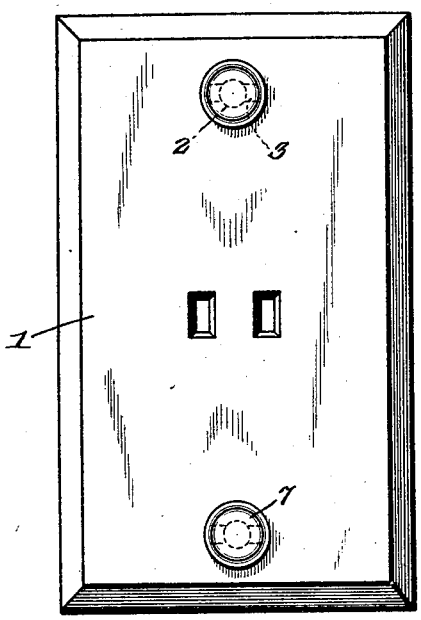
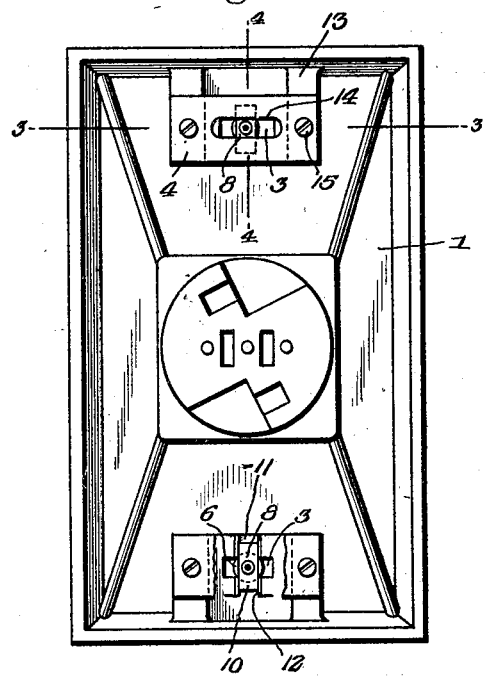
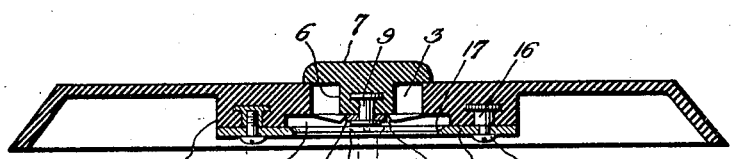
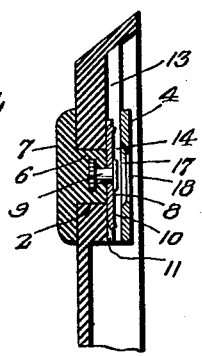
Inventor
R. H. Cunningham,
By
Attorney Patented Jan. 1, 1929.

1,697,348

UNITED STATES PATENT OFFICE.

ROY HERBERT CUNNINGHAM, OF JACKSON, MICHIGAN, ASSIGNOR TO THE REYNOLDS SPRING COMPANY, OF JACKSON, MICHIGAN.

ADJUSTABLE COVER PLATE FOR ELECTRIC WALL BOXES.

Application filed October 28, 1927. Serial No. 229,494.

The invention relates to an adjustable cover plate for electric wall boxes, outlet boxes and the like.

The object of the present invention is to improve the construction of cover plates for electric wall boxes, outlet boxes and the like and to provide a simple, practical and efficient cover plate adapted to be readily adjusted and arranged in perfect alignment with the lines of the building and the room in which it is located.

A further object of the invention is to provide an adjustable cover plate of this character which will be ornamental in its appearance and have its adjusting means interiorly arranged and readily accessible for removal or adjustment.

It is also an object of the invention to equip the adjustable cover plate with removable ornamental closures for the openings which afford access to the interior adjusting means.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims may be resorted to without departing from the spirit or sacrificing any of the advantages of the invention.

In the drawings:—

Figure 1 is an elevation of an adjustable cover plate constructed in accordance with this invention.

Fig. 2 is a rear elevation of the same.

Fig. 3 is a detail sectional view taken substantially on the line 3—3 of Fig. 2.

Fig. 4 is a similar view taken substantially on the line 4—4 of Fig. 2.

Fig. 5 is a detail perspective view of the removable closure button.

In the accompanying drawing in which is illustrated the preferred embodiment of the invention 1 designates an adjustable cover plate constructed of molded bakelite or other suitable insulating material and designed for use as a face plate or cover plate for electric wall boxes, outlet boxes and other fixtures. The plate is provided at each end midway between the sides with an opening 2 having a central circular bearing portion and opposite lateral extensions 3 disposed transversely of the cover plate. The opening 2 is adapted to afford access to a metal clamping plate 4 for the manipulation of a screw 5 for adjustably clamping the cover plate to a wall box, outlet box or the like used in electric wiring. The central bearing portion of the opening 2 is circular to receive a cylindrical shank 6 of a closure button 7 having an enlarged ornamental head which is of sufficient size to cover the opening 2 and conceal from view the interior adjusting means for securing the cover plate to the electric wall box. The cylindrical shank is adapted to rotate in the bearing portion of the opening 2 to carry a resilient strip or spring 8 into and out of alignment with the lateral extensions 3 of the opening 2. The spring 8 is secured to the closure button by means of a suitable headed fastening device 9 embedded in the closure button which is constructed of molded bakelite or other suitable insulating material. The said fastening device 9 pierces the spring and is provided at its inner and outer ends with heads and the said spring projects beyond the shank to form resilient locking arms 10 adapted to be arranged in alignment with the lateral extensions 3 of the opening 2 to permit the button to be inserted in position and to be turned at right angles to such position by a quarter turn of the button to cause the locking arms 10 to snap into grooves 11 formed in the inner face of the closure plate at opposite sides of the bearing portion of the opening 2. The plate is illustrated in the accompanying drawings as being arranged vertically and the grooves are located above and below the opening 2 while the slotted metallic plate is arranged in a horizontal position. The side walls 12 of the groove 11 are slightly inclined to enable the locking arms to be readily turned out of engagement with the groove and when the locking arms are in engagement with the groove the button is securely held against accidental rotation and firmly retained in the opening 2 of the cover plate.

The cover plate is provided at its inner face with enlargements 13 forming seats for the end portions of the slotted plate and supporting the said slotted plate in spaced relation with the inner face of the cover plate and providing an intervening recess 14 for the head of the clamping screw 5. The slotted plate is secured to the enlargements by means of screws 15 which preferably engage threaded bushings 16 embedded in the enlargements, but the slotted plate may be secured to the closure plate at the inner face thereof in any other desired manner and may be an insert when the closure plate is molded. When the slotted plate is applied as an insert its end portions will be embedded in the enlargements. The clamping screw may be an ordinary flat headed screw, but the side walls 17 of the slot 18 of the metal plate may be beveled to receive a screw having a tapering head. The clamping screws of the cover plate are adapted to engage the ordinary lugs of an electric wall box and the plate is applied to the electric wall box before the closure buttons are placed in position. After the screws have been engaged with the lugs of the electric wall box and before they are tightened down so as to firmly bind the metal plates against the lugs, the closure plate can be moved or adjusted by means of the clamping screws and slots to arrange the cover plate in perfect alignment with the lines of the building and room in which it is located. When the proper adjustment of the cover plate has been made the screws can be further tightened so that the heads of the screws will clamp the metal plate firmly and hold the cover plate stationary. The ornamental closure buttons are then placed in the openings of the cover plate and are rotated one quarter revolution to engage the resilient locking arms with the grooves of the cover plate. When it is desired to remove the cover plate the closure buttons may be readily turned one quarter revolution to bring the locking arms opposite the lateral extensions of the opening 2 to permit the removal of the closure buttons. This will afford access to the clamping screws and the blade of a screw driver may be readily passed through the openings 2 for manipulating the clamping screws.

What is claimed is:

1. An adjustable cover plate of the class described, constructed of molded insulating material and provided with an opening, a metal plate carried by the closure plate and supported in spaced relation with the inner face of the same and provided with a slot adapted to receive a clamping screw for securing the cover plate to an electric wall box or the like, the opening in the cover plate permitting access to the head of the screw, and a removable closure having interior attaching means and covering the opening of the cover plate to conceal the clamping screw and the slotted plate.

2. An adjustable cover plate of the class described, constructed of molded insulating material and provided with an opening, a metal plate carried by the cover plate and supported in spaced relation with the inner face of the same and provided with a slot adapted to receive a screw for securing the cover plate to a wall box or the like, and a closure button covering the said opening in the cover plate and provided with a shank extending through the opening and provided at its inner end with engaging means for holding the button in position.

3. An adjustable cover plate of the class described, constructed of molded insulating material and provided with an opening, a metal plate carried by the cover plate and supported in spaced relation with the inner face of the same and provided with a slot adapted to receive a screw for securing the cover plate to a wall box or the like, and a closure button covering the said opening in the cover plate and provided with a shank extending through the opening and provided at its end with a locking arm arranged to be engaged with and disengaged from the inner face of the plate for removably securing the button in position.

4. An adjustable cover plate of the class described, constructed of molded insulating material and provided with an opening having a bearing portion and an extension, a metal plate carried by the cover plate and supported in spaced relation with the inner face of the same and provided with a slot arranged opposite the opening of the cover plate, and a closure button covering the opening of the cover plate and provided with a rounded shank operating in the bearing portion of the opening and having a projecting locking arm movable through the extension of the opening and adapted to be turned out of alignment with the same for engaging the cover plate at the inner face of the same to hold the button in position.

5. An adjustable cover plate of the class described, constructed of molded insulating material and provided with an opening having a bearing portion and an extension, a metal plate carried by the cover plate and supported in spaced relation with the inner face of the same and provided with a slot arranged opposite the opening of the cover plate, and a closure button covering the opening of the cover plate and provided with a rounded shank operating in the bearing portion of the opening and having a resilient locking arm movable through the extension of the said opening and adapted to be turned out of alignment with the same, said cover plate being provided with a groove arranged to receive the locking arm for holding the button against accidental rotation.

6. An adjustable cover plate constructed of molded insulating material and provided with an opening having a bearing portion and opposite extensions, said cover plate being provided at its inner face with grooves located at opposite sides of the bearing portion of the opening, a metal plate carried by the cover plate and supported in spaced relation with the inner face of the same and provided with a slot located opposite the opening of the cover plate and adapted to receive a clamping screw for securing the cover plate to a wall box or the like, and an ornamental closure button covering the opening in the cover plate and provided with a cylindrical shank operating in the bearing portion of the opening, said button being provided at the inner end of the shank with a spring extending beyond the shank and forming locking arms movable through the extensions of the opening and engageable with the said grooves through a partial rotary movement of the button.

7. An adjustable cover plate of the class described, constructed of molded insulating material and provided with an opening and having fastening means located at the inner face of the cover plate for securing the latter in position, said fastening means being operable through the said opening, and a removable closure covering the said opening of the cover plate to conceal the said fastening means and provided with interior attaching means.

In testimony whereof I have hereunto set my hand.

ROY HERBERT CUNNINGHAM.